United States Patent [19]
Pfeffer et al.

[11] Patent Number: 5,761,734
[45] Date of Patent: Jun. 2, 1998

[54] TOKEN-BASED SERIALISATION OF INSTRUCTIONS IN A MULTIPROCESSOR SYSTEM

[75] Inventors: Erwin Pfeffer, Holzgerlingen; Klaus-Joerg Getzlaff; Ute Gaertner, both of Schoenaich; Hans-Werner Tast, Schoenbuch, all of Germany

[73] Assignee: International Business Machines Corporation, Armonk, N.Y.

[21] Appl. No.: 689,762

[22] Filed: Aug. 13, 1996

[51] Int. Cl.$^6$ ..................................... G06F 12/16
[52] U.S. Cl. ............... 711/164; 395/200.31; 395/676
[58] Field of Search .................... 395/377, 200.31, 395/676, 800.18; 711/163, 164, 141

[56] References Cited

U.S. PATENT DOCUMENTS

| | | | |
|---|---|---|---|
| 4,328,542 | 5/1982 | Anastas et al. | 711/163 |
| 5,140,685 | 8/1992 | Sipple et al. | 711/164 |
| 5,307,495 | 4/1994 | Seino et al. | 395/676 |
| 5,317,739 | 5/1994 | Elko et al. | 395/200.46 |
| 5,396,614 | 3/1995 | Khalidi et al. | 711/118 |
| 5,463,741 | 10/1995 | Levenstein | 395/200.55 |
| 5,537,574 | 7/1996 | Elko et al. | 711/141 |

*Primary Examiner*—William M. Treat
*Attorney, Agent, or Firm*—Marc A. Ehrlich

[57] ABSTRACT

A process is disclosed to serialize instructions that are to be processed serially in a multiprocessor system, with the use of a token, where the token can be assigned on request to one of the processors, which thereupon has the right to execute the command. If the command consists of dristibuted tasks, the token remains blocked until the last dependent task belonging to the command has also been executed. It is only then that the token can be assigned to another instruction. Moreover, a device is described to manage this token, which features three states: a first state, in which the token is available, a second state, in which the token is assigned to one of the processors, and a third state, in which the token is blocked, because dependent tasks still have to be carried out. Moreover, a circuit is disclosed with which the token principle that is introduced can be implemented in a simple manner. The token is only available if none of the processors i is in possession of the token and if no dependent task is pending at any of the processors. The OR chaining of signals to form a signal C which is set if the token is not available represents the basic circuitry with which the serialisation of commands consisting of distributed tasks is carried out. The invention is applied particularly in the case of commands such as IPTE (invalidate page-table entry) and SSKE (set storage key extended), which modify the address translation tables in the memory that are used in common by all processors.

24 Claims, 12 Drawing Sheets

SEGMENT TABLE ENTRY

```
0  1         ...        25 26 27 28    ...      31
┌──┬──────────────────────┬──┬──┬──────────────────┐
│ 0│  PAGE TABLE ORIGIN   │  │  │  PAGE TABLE LENGTH│
└──┴──────────────────────┴──┴──┴──────────────────┘
                              ↑
                         PAGE TABLE INVALID BIT
```

FIG.2A

PAGE TABLE ENTRY

```
0  1    ...           19 20 21 22 23 24 ... 31
┌──┬──────────────────────┬──┬──┬──┬──┬─────────┐
│ 0│  PAGE FRAME ADDRESS  │ 0│  │  │ 0│         │
└──┴──────────────────────┴──┴──┴──┴──┴─────────┘
                                ↑
                          PAGE INVALID BIT
```

FIG.2B

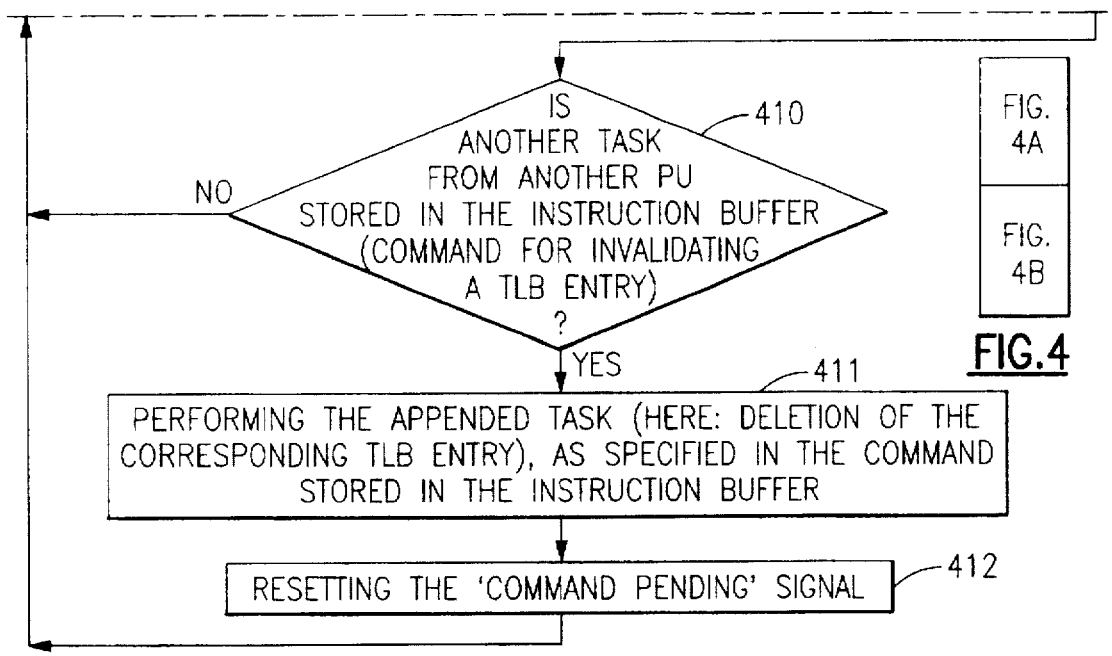
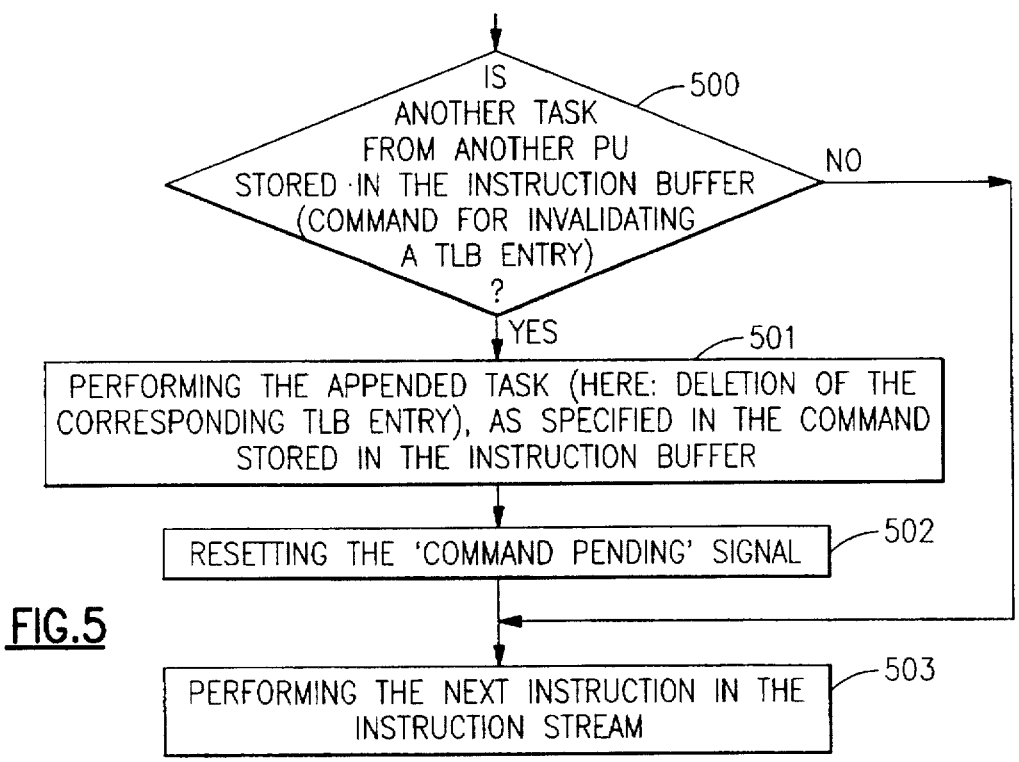

TOKEN-BASED SERIALISATION OF INSTRUCTIONS IN A MULTIPROCESSOR SYSTEM

BACKGROUND OF THE INVENTION

The invention relates to a process for the serialisation of instructions in a multiprocessor system, with the help of a token, and a to device to manage the token. In particular, the invention relates to commands such as IPTE (Invalidate Page-Table Entry) or SSKE (Set Storage Key Extended), which modify a resource common to all processors.

In a multiprocessor system, each of the processors processes a flow of instructions which is assigned to it by the operating system. For example, a first processor processes a program which is stored in a specified page in the memory, whilst a second processor executes a program of the operating system which is stored in another page. The assignment of the individual programs to the executing processors takes place in this instance by means of special routines in the operating system; when a processor has worked through the program which has been allocated to it, the operating system stipulates which new program should be assigned to the processor which has now become available again.

Conflicts arise when two processors access the same memory address during the execution of their respective programs. At first, in fact, only the respective private level 1 caches of the processors are modified; later on, however, in order to guarantee the integrity of the data, it must be possible to judge which of the two levels of authority stored in the L1 caches should be valid.

More serious problems concerning data integrity arise when one of the processors in the multiprocessor system modifies a resource which is common to all processors.

In this case, it must be ensured that the modification of this resource does not lead to an undefined status of the resource for instructions which are just being executed on other processors. Otherwise, violations of data integrity occur.

In the execution of commands which modify a resource that is common to all processors, it may be necessary that all the other processors take note of the modification which has been effected, for example because local copies of the joint resource must be updated. It may therefore happen that the command to modify the joint resource initiates a series of daughter processes, which have to be executed on all the other processors.

An important point in the execution of all these processes is correct scheduling with respect to the maintenance of data integrity.

An example of an instruction of this sort can be encountered in the field of multiprocessor systems which address the memory by means of virtual addressing. The translation of virtual addresses into real ones usually takes place with the use of several tables which are stored in the memory and are related to one another. FIG. 1 shows the structure of these tables. The initial address of the first table required for the translation, the segment-table, is stored in a control register of the CPU. Starting from the segment-table origin that is specified in this way, it is possible to use the segment index (which is formed by bits 1 to 11 of the virtual address) in order to reach that entry in the segment-table which contains the initial address for the page-table that is required for the further translation.

FIG. 2A shows an entry in the segment-table. Each entry indicates not only the initial address of the page-table to which reference is made (the page-table origin), but also its length. If a page-table is no longer supposed to be used for the address translation, it must be identified as no longer valid. This is done by setting the page-table invalid bit. Only those page-tables whose page-table invalid bit is not set—and is therefore equal to zero—may be used for the address translation.

Now, in the next stage of the address translation, the initial address for the requisite page frame is determined with the help of the page-table which has been found in the meantime. FIG. 1 again shows how this takes place. The purpose of an index in order to reach the relevant entry in the page-table is served by the middle area of the virtual address, the page index (bits 12 to 19 of the virtual address). The page-table entry which is found in this manner refers to the initial address of the page frame in which the required page is stored. In this instance, a page frame is an address area in the memory in which a page can be accommodated.

FIG. 2B shows a page-table entry. This contains the initial address of the page frame. Furthermore, a page invalid bit is present, which indicates whether the data for the specified page are valid. A page-table entry may only be used for address translation if this page invalid bit is not set, and is therefore equal to zero.

Now, in order to determine the real address which should be accessed, the byte index of the virtual address (bits 20 to 31) has to be added to the initial address of the page frame, as is shown in FIG. 1. For this purpose, the byte index is appended to the rump address of the page frame. The address which is obtained in this manner is the real address. Now, in order to obtain the absolute address on the basis of this real address, it may be necessary to add a so-called prefix to the real address. The memory can be accessed directly by means of the absolute address which is obtained in this manner.

The multi-stage translation of virtual addresses into real ones which has been described thus far is very time-consuming, since a whole hierarchy of tables has to be searched through. Approximately 50 processor cycles are necessary for the translation of one single address.

For this reason, address translation caches (or, in brief, TLBs, Translation Lookaside Buffers) have been introduced to enable the rapid location of the real initial address of a page frame in a manner which circumvents the detailed translation by means of segment-table and page-table. For this purpose, in the address translation cache entry which relates to the page, the high-order part of the virtual address (that is to say, the segment index and the page index) are set in relation to the real initial address of the page frame. This entry is created on the first occasion that the page is addressed, and it is used thereafter on every subsequent occasion that the page is addressed. In comparison with the explicit translation by means of the segment-table and page-table which are stored in the memory, a considerable advantage of speed is achieved, since only a few processor cycles are required for the lookup in the address translation cache.

Each processor has its own address translation cache which is assigned to it, and which stores the address translations performed by the processor according to sequence. Now, if a virtual address is to be translated into the real address assigned to it, the processor first checks whether it has stored an entry concerning this page in its address translation cache. Only if this is not the case does the processor translate the virtual address with assistance from the tables in the memory.

The address area which is opened up by means of virtual addressing is many times greater than the size of the available memory. For this reason, at any specified point in time, only a part of the virtually addressable pages is actually present in the memory. The other pages are located on an external storage medium.

Now, in the event that a processor accesses a page which is not present in the memory, another page has to be transferred out of the memory on to the external storage medium. The new page which the processor wishes to access can be stored in the empty position thus created in the memory. This process of the dynamic storage and transfer of pages is described as "swapping".

When a page is transferred out of the memory on to the external storage medium, the entry in the page-table which relates to this page must also be invalidated, since this entry had actually referred to the real initial address of the page in the memory. This takes place by setting the page invalid bit in the relevant page-table entry. FIG. 2B shows the structure of the page-table entry; the page invalid bit is bit 21 in this case. A page-table entry whose page invalid bit is set may no longer be used for the address translation.

By transferring a page on to the external storage medium and invalidating the relevant page-table entry, an empty position is created in the memory, in which another page can be stored.

When a processor addresses a page which is not yet present in the memory, the page in question must be entered into the memory from the external storage medium (demand paging). This new page now occupies the empty position which has been created by invalidating an old page and transferring it to storage elsewhere. For this new page, a new page-table entry is created, by means of which a completely different area of virtual addresses is mapped on to the same area of absolute addresses in the memory as was previously occupied by the old page.

Thus far, there has been discussion of the necessary modifications to the entries in a page-table when pages are entered into storage in the memory, or transferred to external storage from it. However, entries also exist in the address translation caches which are assigned to the individual processors, referring to the page—which has been transferred to external storage in the meantime. As well as the entry in the page-table, these entries in the TLBs must also be declared 'invalid', in order to prevent the processor assigned to the address translation cache from using these entries, and thus from attempting to address pages which have already been transferred out of the memory and whose place in the memory has been occupied by another page. If the TLB entries which refer to transferred pages were to continue to exist in the TLBs, then the assigned processor would address a completely different page than the desired one.

In this respect, for the purpose of invalidating a page which is to be transferred out of the memory, it is necessary on the one hand to invalidate the corresponding entry in the page-table, but on the other hand, to invalidate all the entries relating to the page in all the address translation caches which are assigned to the individual processors as well.

The results of this are that, in order to invalidate one entry in the page-table, it is necessary on the one hand for the page-table entry itself (as well as the entry relating to the page to be transferred in the TLB assigned to the initiating processor) to be invalidated by the processor initiating the invalidation, but on the other hand, for dependent tasks to be initiated on all other processors, in order to invalidate the entries relating to the page to be transferred in the address translation caches which are assigned to these processors.

In this case, the common resource that is to be modified is the relevant page-table in the memory, which is of course accessed by all processors, whilst the corresponding entries in the address translation caches represent local copies of the common resource. In the case of a modification to the common resource, the local copies must also be updated.

An important point is that during the execution of the initial task on the initiating processor and the execution of the tasks which are dependent on it on the other processors (the responders), the data integrity should be safeguarded in respect of the address translation. An instruction which is executed on any processor whatsoever must be consistently able to carry out the address translations which it requires during its execution on any one of the processors, and this, moreover, must be independent of whether the address translation is undertaken via the long path using a hierarchy of tables in the memory, or via the short path using the address translation cache.

In this respect, it is necessary for the initial task (which is executed on the initiating processor) and the tasks dependent on it (which are executed on the other processors) to be serialised in a suitable manner with the other instructions to be executed on the respective processors.

Now, there are a whole series of computer commands in a multi-processor system, which take place according to the scheme that has been presented, and in which a resource common to all the processors is therefore modified by an initiating task, while at the same time, local copies of the common resource are available which are updated by tasks that are dependent on the initiating task. The invalidation of a page-table entry (IPTE, Invalidate Page-Table Entry) which has just been discussed is an example of a command of this sort.

Other examples of computer commands of this sort relate to the modification of the key information which is assigned to every page, and which stipulates the access rights to this page. The key information is stored on the one hand in the key storage, but on the other hand, in the address translation cache entries as well. In order to modify the key information assigned to a page, it is necessary on the one hand to modify the central resource—the key storage; on the other hand, however, it is also necessary to update the local copies of the key information in the address translation caches of the individual processors.

Again, an initial task is carried out to modify the common resource, as well as tasks dependent on this initial task for the purpose of updating the local copies.

In the case of these commands too, it must be ensured that the data integrity is safeguarded. During the course of the performance of an instruction, modification of the key of a page addressed by this instruction must be prevented. This requires suitable scheduling of the initiator task and of the dependent tasks.

A solution to this problem is represented by the so-called 'Quiescence' method, which is shown in FIG. 3. In the case of this method, that processor which wishes to execute the 'IPTE' command (Invalidate Page-Table Entry) sends a 'Quiescence Request' to all other processors. These processors are just executing instructions which were started before the 'Quiescence Request' (301). When one of these instructions has been executed completely (302), the relevant processor inserts a waiting period (304) until the last processor has also completed the execution of its instruction (303) which is still pending. From this moment on, all the processors are in the 'Quiescence Mode' (305). Pub can now invalidate the corresponding page-table entry as well as an entry in its own TLB which relates to the page to be transferred to external storage. The other processors are induced to delete entries relating to this page in the TLB which is assigned to them.

After the full completion of the IPTE command, the initiating PU sends a 'Reset Quiescence' (308) to all the other processors, which thereupon continue with the processing of the next instruction in the instruction flow (309). After PU0 has sent the 'Reset Quiescence', it too continues with the processing of the subsequent instruction.

The disadvantage of this method is that long waiting periods ensue on the processors which are executing the dependent tasks, during which these processors are prevented from executing the next instructions. For each processor, the waiting period begins in each case with the completion of that instruction which was just being executed when the initiating processor sent out its "Quiescence Request" (302), and it ends at the point in time when the last processor has also completed (303) the execution of the respective command which was pending at the time of the 'Quiescence Request'. While the initiating processor is invalidating the page-table entry, waiting times again ensue on the other processors (307) until the request to carry out the dependent tasks arrives. These waiting periods which come into being on the responder PUs are not inconsiderable, and they impair the performance that can be achieved.

A method whereby these waiting periods which come into being on the responder PUs are avoided is described by Padegs et al. in U.S. Pat. No. 3,947,823. The objective of the solution proposed here is for the memory addresses (and the contents thereof) which are used by each of the instructions just pending on any given processor to be kept for those instructions until their completion. This takes place by means of the introduction of special buffer memories for the memory addresses and contents which are accessed by the instructions. As a result of this, the instruction becomes independent of the actual memory pages, addresses and contents, since there is no longer any access to these during the execution of the instruction. The invalidation of the entries in the page-table and in the address translation caches, and the transfer of the page to the external I/O device can therefore be performed without taking account of any instructions which are still being executed, even if these instructions access addresses on the page which is to be transferred to external storage. In the case of this method, there is consequently no need to pay attention to correct scheduling with respect to the data integrity. For this reason, waiting periods in connection with the execution of the dependent tasks can be avoided with the help of this method.

However, the disadvantage of this method is to be seen in the costly additional hardware which is necessary for the temporary storage of all the addresses and address contents required by the instructions that are just in the process of being executed.

In the publication "Low-Synchronization Translation Lookaside Buffer Consistency Algorithm" which appeared in the IBM Technical Disclosure Bulletin, Vol. 33, No. 6B, November 1990, pages 428-433, B. S. Rosenburg presents a process to invalidate a page-table entry in which the waiting periods on the responder processors are avoided. For this purpose, the initiating processor firstly invalidates the corresponding page-table entry and identifies the modified page-table. Then, interrupts are sent to the responder processors, in response to which—at an interruptible point in their instruction flow—they search through the active page-tables for modifications. If a page-table entry has been invalidated, the responder processor invalidates a corresponding local TLB entry, in the event that there is one. Following this, the responder processor continues with the processing of the next instruction in the instruction flow.

The disadvantage of this method is that every responder PU has to search through all the page-tables for flaggings and invalidated entries. This manner of proceeding costs a very great deal of time. A further disadvantage is that there is no discussion of the aspect of data integrity in relation to instructions which access the modified page-table. However, it is precisely the data integrity aspect which is essential for technical solutions that relate to the serialisation of commands consisting of distributed tasks.

SUMMARY OF THE INVENTION

It is the task of the invention to provide a process for the serialisation of instructions in a multiprocessor system. In this case, the need to serialise specified commands arises from the fact that these commands modify a resource which is common to all processors.

It is the particular task of the invention to provide a suitable serialisation process for the execution of commands which consist of one initial task to be executed on the initiating processor, and tasks dependent upon this initial task which are to be executed on the other processors. The execution of dependent tasks may be necessary if local copies of the joint resource have to be updated.

It is the further task of the invention to minimise the waiting period which comes into being during the execution of the various tasks, in order to guarantee high performance.

It is also important to ensure the data integrity during the execution of commands which consist of distributed tasks.

It is the particular task of the invention to propose an improved type of execution specifically for the command to invalidate a page-table entry, IPTE, and for the command to modify the key information relating to a page, SSKE.

It is also intended to disclose a device to manage the token with which the proposed serialisation process can be carried out.

Furthermore, it is the task of the invention to implement this device with a low outlay on hardware.

According to the invention, the task is accomplished by means of a device to manage a token for the serialisation of instructions which are to be processed serially in a multiprocessor system, where a processor can only execute the instructions which are to be processed serially if it is in possession of a token, and the device to manage the token features the following states:

a first state, in which the token is not assigned to any of the processors, and the token can be assigned to a processor which requests the token;

a second state, in which the token is assigned to one of the processors, and the token cannot be assigned to a processor which requests the token; and a third state, in which the token is not assigned to any of the processors, and the token cannot be assigned to a processor which requests the token.

The serialisation of the instructions to be serialised is therefore regulated by the allocation of the token. Provision is additionally made in this case made for a third state, in which the token is blocked. By this means, the execution of the instructions to be serialised can be coupled to external conditions: depending on these conditions, the token can be blocked and the execution of the instructions to be serialised can thus be prevented.

The device to manage a token in a multiprocessor system which comprises n processors is implemented according to the invention by the availability for each processor i of one signal Ai, which is set if processor i is in possession of the token;

the availability for each processor of one signal Bi which is set when a task that has not yet been fully executed is pending at processor i, which task must be serialised with the execution of one of the instructions to be processed serially, on account of which the token cannot be assigned to a processor which requests the token;

and the availability of a signal C which is common to the entire multiprocessor system, which results from the OR chaining of the previously listed A1, . . . An, B1, . . . Bn signals of all the processors, and which is set if the token cannot be assigned to a requesting processor;

where the first state of the device to manage a token is characterised in that none of the signals A1, . . . An, B1, . . . Bn is set;

where the second state of the device to manage a token is characterised in that one of the signals A1, . . . An is set;

and where the third state of the device to manage a token is characterised in that none of the signals A1, ... An is set, but that at least one of the signals B1, . . . Bn is set.

The advantage of this implementation is that the state of the device to manage the token is represented in a very simple manner. As a result of this, the requisite outlay on hardware is kept low; the basic circuitry necessary for the serialisation of the instructions is restricted to an OR chaining of the signals A1, . . . An, B1, . . . Bn.

A further advantageous development of the invention envisages the availability, for each processor i, of one signal Ci which results from an OR chaining of the signals Ai and Bi;

and for the signal C, which is common to the entire multiprocessor, to result from an OR chaining of the signals C1, . . . Cn of all the processors.

Since the signal C is a signal which is common to the entire multiprocessor system, it represents an advantage from the circuit engineering viewpoint if the signals Ai and Bi, which are assigned to each processor i, are first concatenated to form one signal Ci, by means of an OR gate located on each processor, since then only one signal— namely the Ci signal—needs to be fed from each processor to the central OR gate.

In a further advantageous development of the invention, the instruction which is to be processed serially comprises a first task to be executed on the initiating processor, and dependent tasks to be executed on the responder processors, where the token must be assigned to the initiating processor, so that the initiating processor can execute the first task, and where the token cannot be assigned to a processor which requests the token until the completion of all dependent tasks.

This development of the invention makes clear which advantages become possible with the third state which the token may assume according to the invention. In the case of instructions which comprise distributed tasks that are to be executed on different processors, the initiating processor must be in possession of the token in order to initiate the execution of the instruction. However, as long as tasks that are still pending are in the process of execution, the token remains blocked, although the initiating processor may perhaps have finished with its task already and may have replaced the token. In this way, the dependent tasks make it impossible to start on the execution of a new command which is to be processed serially.

In a further advantageous design form of the invention, an instruction buffer is assigned to each processor of the multiprocessor system, where the initial processor writes commands and/or addresses into the instruction buffer of the responder processors during the execution of the first task, and these commands and/or addresses specify the dependent tasks to be executed on the responder processors.

In this way, the initiating task can initiate the necessary dependent tasks, without having to interrupt the responder processors. It is only when the responder processors have reached a point where they can execute the dependent tasks that account is taken of the information that was written into the instruction buffer.

In a further advantageous development of the invention, the writing into the instruction buffer of the responder PUs is carried out by means of a Broadcast Forced Operation.

Furthermore, it is advantageous to set the Bi signal ('command pending') together with the writing of the commands or addresses into the instruction buffer of the responder processor i.

Correspondingly, it is more advantageous to reset the signal Bi on conclusion of the respective dependent task on the responder processor I.

In a further design form of the invention, the dependent task is inserted and executed at an interruptible point in the instruction flow of the responder processors.

In this way, waiting periods on the responder processors can be avoided and the performance is considerably improved.

One command for which a solution based on a reminder is particularly advantageous is the SSKE command (Set Storage Key Extended)

Here, the multiprocessor system comprises a memory, whereby in order to address the memory, a translation of virtual addresses into real ones can be undertaken with the help of address translation tables, where address translations which have already been performed are stored in address translation caches, each of which is assigned to one of the processors, where key information to stipulate the access rights of the individual processors to a page is stored in one part of the memory, namely the key storage, where the instruction to be processed serially is an instruction to modify the key information (SSKE), where the initiating processor modifies the key information in the key storage during the execution of the first task, and where, during the execution of the dependent tasks, the other processors modify the key information in the address translation caches assigned to them.

Since each of the processors is affected by the modification of the key in the key storage, a serialisation of the commands is necessary from the aspect of data integrity in the case of the SSKE. The assignment of the token to another command must also be prevented during the execution of the dependent tasks.

One command for which a reminder-based solution is particularly advantageous is the command to invalidate entries in a page-table, IPTE (Invalidate Page-Table Entry):

here, the multiprocessor system comprises a memory, whereby in order to address the memory, a translation of virtual addresses into real ones can be undertaken with the help of address translation tables, where address translations which have already been performed are stored in address translation caches, each of which is assigned to one of the processors.

where the instruction to be processed serially is an instruction to invalidate a page-table entry (IPTE), where the initiating processor invalidates the page-table entry during the execution of the first task, and where, during the execution of the dependent tasks, the other processors invalidate corresponding entries in the address translation caches which are assigned to them.

A serialisation is particularly important from the aspect of data integrity in the case of the invalidation of page-table entries, which of course affect all the processors, since all the processors access tables in the memory for the purpose of address translation. It should also be impossible to initiate a new IPTE as yet during the execution of the dependent tasks, which, in the case of the IPTE, invalidate TLB entries. Specifically for this purpose, advantages attach to a device to manage a token in which the token can be in the blocked state even after it has been replaced.

An advantageous design form of the invention, specifically in connection with the invalidation of page-table entries, is represented by the introduction of an n-fold associative address translation cache, where an instruction which requires more than n address translations is serialised with the instruction to invalidate a page-table entry (IPTE).

The IPTE can be serialised in advantageous manner with a command of this sort which requires more than n address translations by the following means:

the token must be assigned to a processor i, so that the processor i can execute the instruction which requires more than n address translations.

With these measures, it is possible to ensure that the data integrity is safeguarded. Due to the n-tuply associative address translation cache, there is no need for a serialisation of the IPTE with commands which require address translations whose number is less than or equal to n. This saves time and expense.

The process according to the invention, for the serialisation of instructions which are to be processed serially in a multiprocessor system, where the execution of one of the instructions that are to be processed serially comprises the execution of a first task on an initiating processor, where the initiating processor can only execute the first task if it is in possession of a token, and where the token, if it is available, can be assigned precisely to one of the processors, comprises the following steps:

request for the token from the initiating processor;

assignment of the token to the initiating processor, if the token is available;

execution of the instruction to be processed serially;

replacement of the token after the completion of the first task of the instruction that is to be processed serially, as a result of which the token need not necessarily become available for other processors;

establishment of the availability of the token after the completion of the instruction that is to be processed serially.

In the case of this process, the performance of the initial task is dependent on the executing processor possessing the token. This processor also replaces the token when it has completed the execution of the initial task.

The advantage according to the invention consists in the fact that it is nevertheless possible to take account of whether the tasks belonging to the command which are to be executed on other processors have all been fully completed already. It is only on completion of the entire command, also including the tasks on the other processors, that it is possible to execute a new command which is to be processed serially. According to the invention, it is not until then that the availability of the token is re-established.

BRIEF DESCRIPTION OF THE DRAWINGS

FIG. 2A shows the structure of a segment-table entry.

FIG. 2B shows the structure of a page-table entry.

FIGS. 4, 4A, and 4B show a flow chart representing the sequence of steps, according to the invention, in the execution of the initial task of a command consisting of this initial task and also of dependent tasks, using the example of the invalidation of a page-table entry.

FIG. 5 shows a flow chart representing the sequence of steps, according to the invention, in the execution of a dependent task of a command consisting of an initial task and also of dependent tasks, using the example of the invalidation of a page-table entry.

DESCRIPTION OF THE PREFERRED EMBODIMENTS

Figure 1:
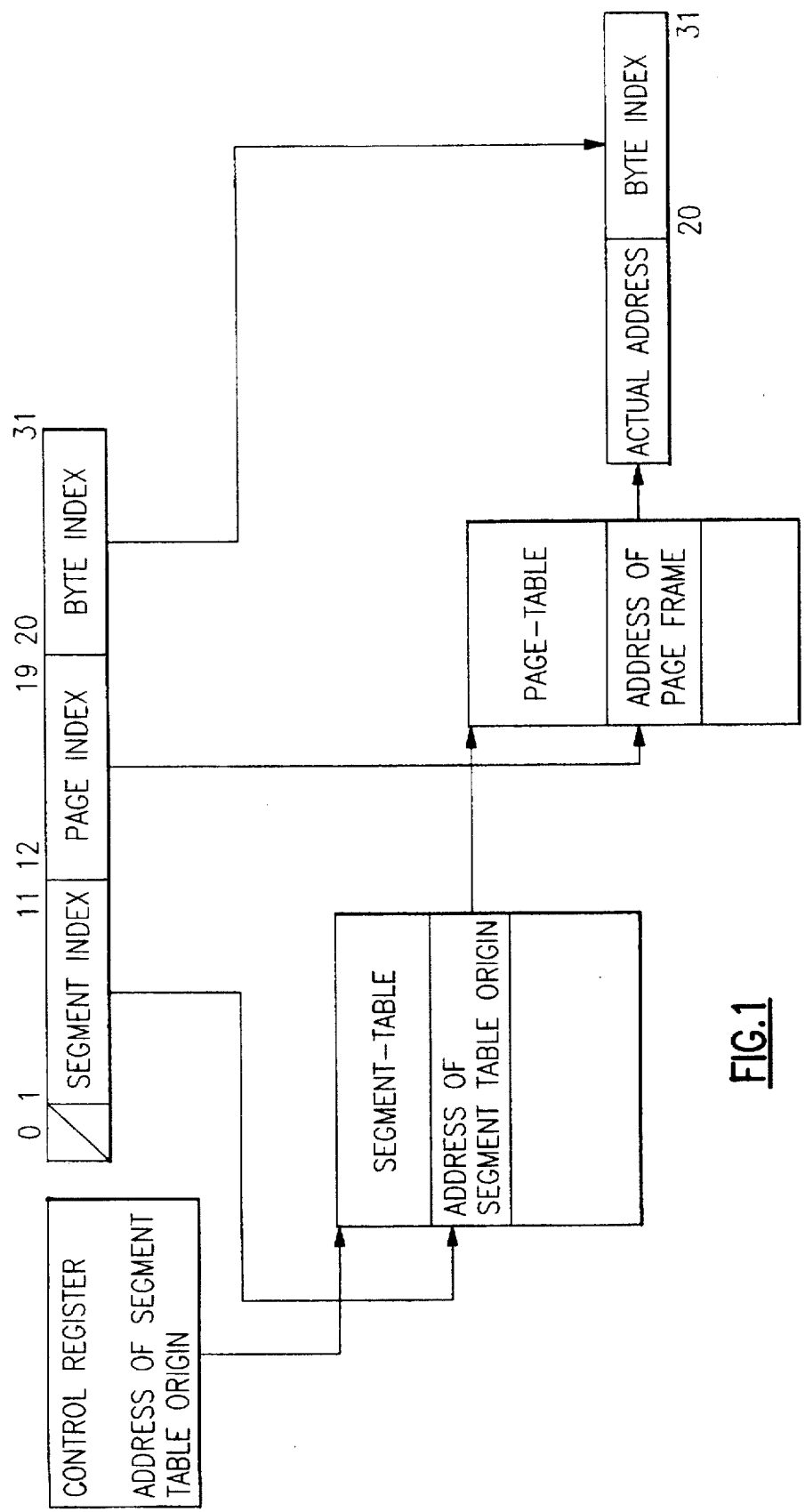
FIG. 1 shows how a virtual address is translated into a real address by means of a segment-table and a page-table.
Figure 3:
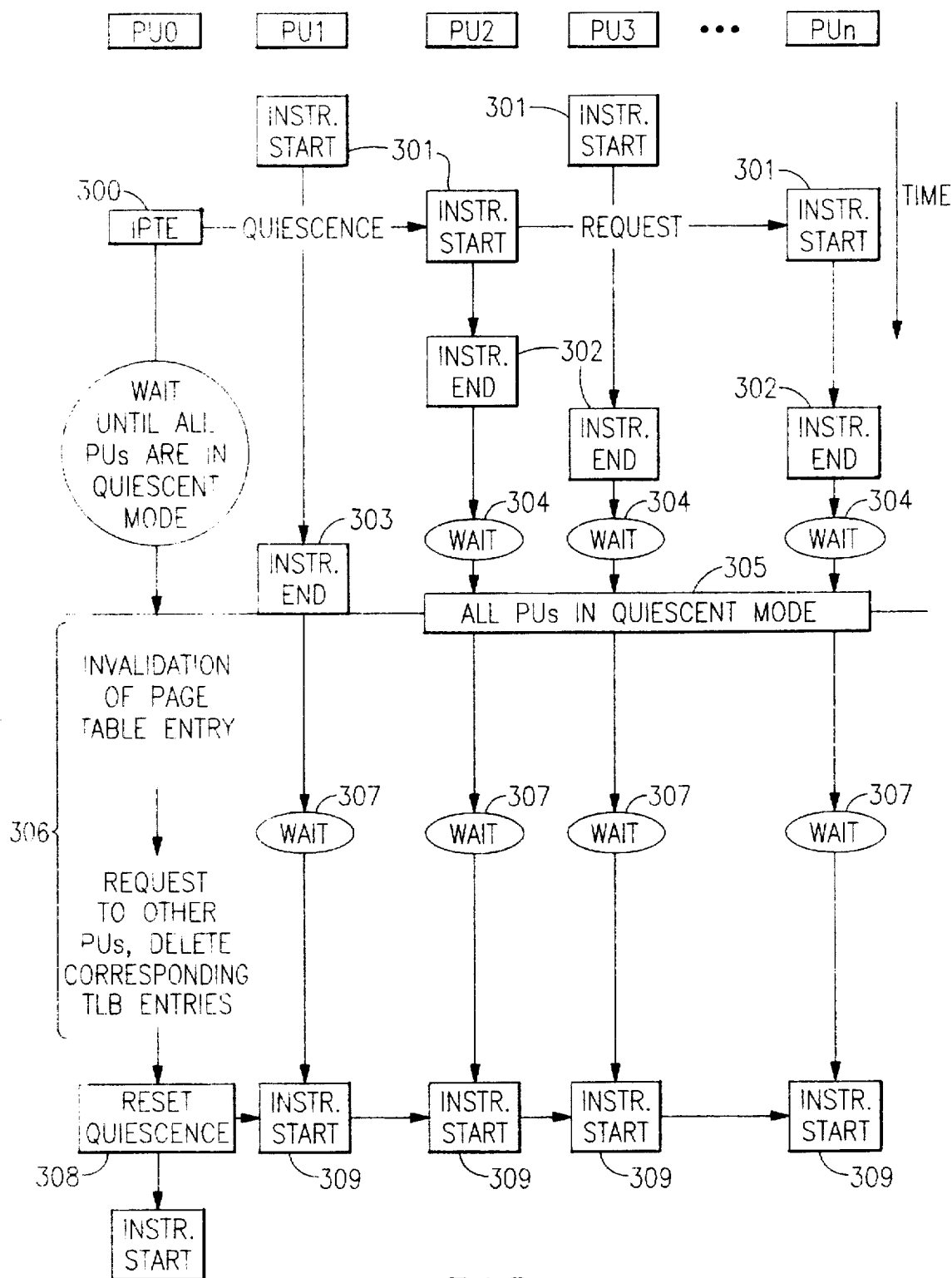
FIG. 3 shows the time sequence of a command to invalidate a page-table entry in a multiprocessor system, as has been implemented in the state-of-the-art (Quiescence Method).
Figure 4A:
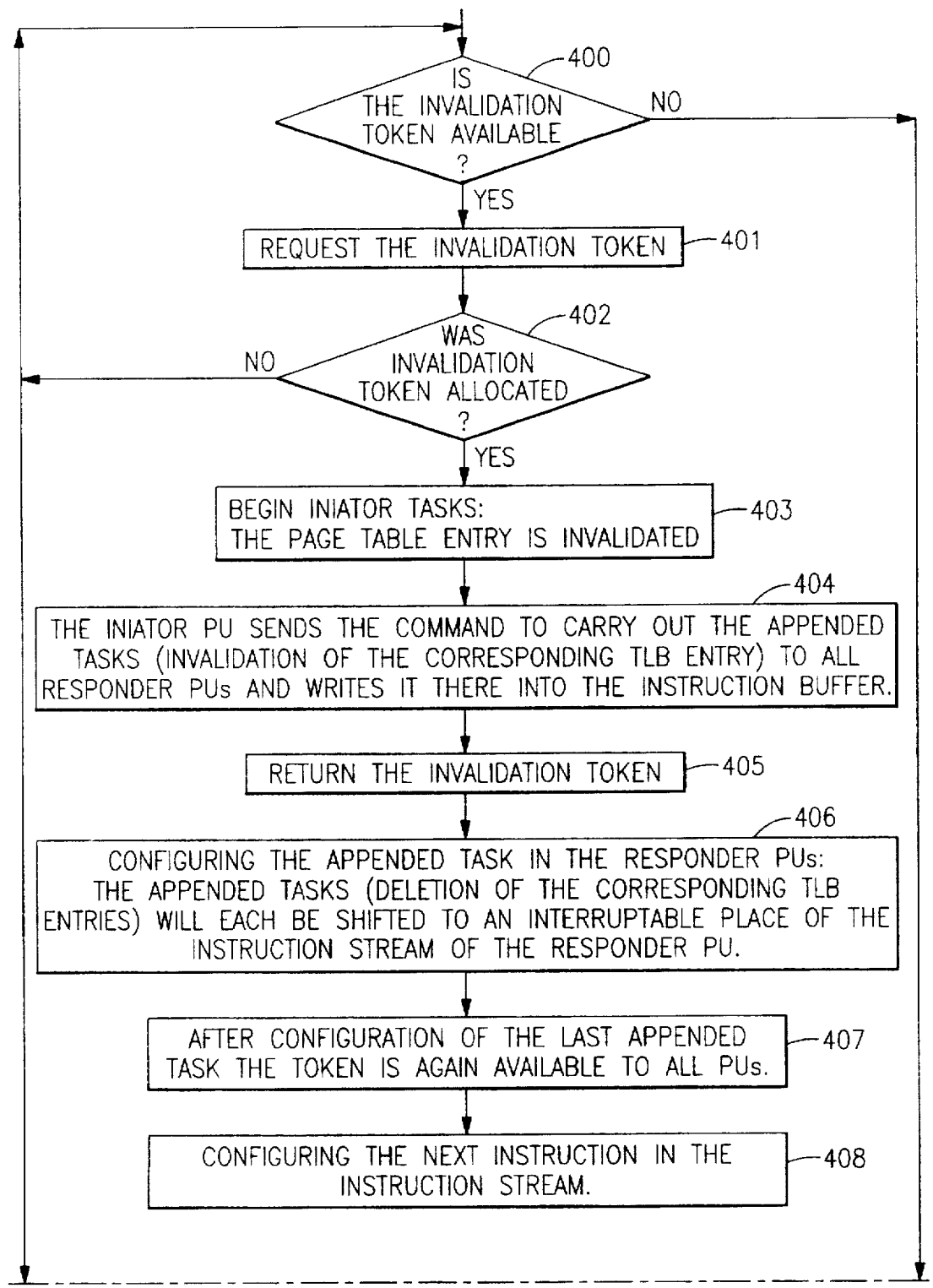

FIG. 4 shows the sequence of the initial task which is carried out on the initiating processor. As an example, the invalidation of a page-table entry is considered. The basic sequence of the execution of the command is nevertheless the same for all commands which consist of an initial task and tasks dependent on this initial task. To remain with the example of the IPTE (Invalidate Page-Table Entry): in this instance, when the initial task is being executed, the entry relating to the page in the page-table must first be invalidated by setting the page invalid bit; then, in a second step, the entry relating to the page in the TLB of the initiating PU must be invalidated. Furthermore, the initiating processor must request the other processors—the responder PUs—to invalidate the entries relating to the page in the TLBs which are assigned to them as well.

Now, in order to arrive at a reasonable serialisation of commands which access the address translation tables stored in the memory, the processor carrying out the invalidation must request and be assigned a token. Only a processor which is in possession of a token may undertake a modifying access to the address translation tables. Moreover, only one processor can be in possession of the token at any one time. With the help of the token, which may be compared to a relay baton, the access rights of the processors to the common resource are regulated.

Now, when a page is to be invalidated by a processor, the processor determines—in a first step (400)—whether the invalidation token is available ('token available'). If the token is not available, the performance of the initial task must be post-poned. In a case where the token is available, it can be requested by the initiating processor in the next step (401). Then, an enquiry is made (402) as to whether it was possible to assign the invalidation token to the requesting processor ('token received'). If this is not the case, there must have been some change to the availability of the token in the meantime; for this reason, there is a jump back to the start of the sequence (400). If it was possible to assign the token ('token received'), the initiating processor can start on the execution of the initiator task.

First of all, the page-table entry relating to the page to be transferred into external storage is invalidated (403). In a next step (404), the initiator PU sends the command to execute the dependent tasks to all responder PUs. This takes place by means of a so-called Broadcast Forced Operation, which sends the command to invalidate a TLB entry relating to this page—together with the address of the page to be invalidated—to all responder PUs, and writes it into the respective invalidation buffers there. The initiator PU has thus notified all responder PUs of what is to be done. The question of when the respective invalidations of the TLB entries relating to the page are to be carried out is now a matter for the responder PUs. However, all the information which the responder PUs will then need for the modification of their TLBs is already stored in the invalidation buffers. The status in the responder PUs is now 'command pending', which means that another dependent task is pending.

On performance of the Broadcast Forced Operation, the end of the initiator task is reached, and the initiator can therefore replace the invalidation token in step (405). Consequently, although the initiator PU is no longer in possession of the token, the token can nevertheless not be assigned to any other PU which requests the token, since dependent tasks are still pending at the responder PUs.

Step (406) describes how the commands stored in the invalidation buffers of the responder PUs are processed by the responder PUs. For this purpose, the dependent task (which, in the case of the page-table invalidation, is intended to delete the corresponding TLB entries) is looped in and executed at an interruptible point in the instruction flow of the respective responder PU. The 'command pending' status of a responder PU disappears on the complete execution of the dependent task. Now, when the last dependent task which is still pending has been completely executed by its processor, the availability of the token to requesting processors is re-established (407). The token is 'available' again. This means that a requesting processor can be assigned the token, and can thus be placed in a position to undertake invalidations of page-table entries for its part. With step (407), the execution of the initiator task on the initiating PU is completed, and the initiating PU can now process the next instruction in the instruction flow (408).

In step (400), the initiating processor checks whether the invalidation token is available. If this is not the case, that is to say, if the status 'token available' is not present, then the initiating processor—which is now, of course, prevented from executing the initiator task—checks in step (410) whether a dependent task from another PU is stored in the instruction buffer. In the example of the IPTE, this would be a command to invalidate a TLB entry. If no dependent task of this sort is waiting to be executed, the processor jumps back again to the initial enquiry (400), with which the availability of the token is again checked. However, if a dependent task from another PU is stored in the instruction buffer, this dependent task is executed in step (411). Thus in the case of the IPTE, the TLB entry corresponding to the page to be transferred to external storage is invalidated. The data required for the invalidation are stored in the instruction buffer. On completion of the dependent task, the signal 'command pending' is then reset in step (412). Following this, the processor jumps back to the enquiry (400) in order to verify once again whether the invalidation token has become available in the meantime.

The corresponding scheme from the viewpoint of a responder PU is shown in FIG. 5. After the responder PU has completed the processing of the instruction which is just being executed, the enquiry step (500) is run through. This checks whether another PU has written a command to invalidate a TLB entry into the invalidation buffer of the responder PU under consideration, by means of a Broadcast Forced Operation. If this is not the case, the responder PU continues with the execution of the next instruction in the instruction flow (503). However, in the event that a dependent task is pending, and the responder PU is therefore in the 'command pending' status, the dependent task is executed according to the command stored in the instruction buffer, in step (501). In the case of the invalidation of a page-table entry, the TLB entry relating to the page to be transferred to external storage would therefore be invalidated. Whereupon, in step (502), the signal 'command pending' would be reset in order to show that there is no longer a dependent task pending on the responder PU under consideration. Following this, in step (503), the next instruction in the instruction flow can be processed.

Figure 6:
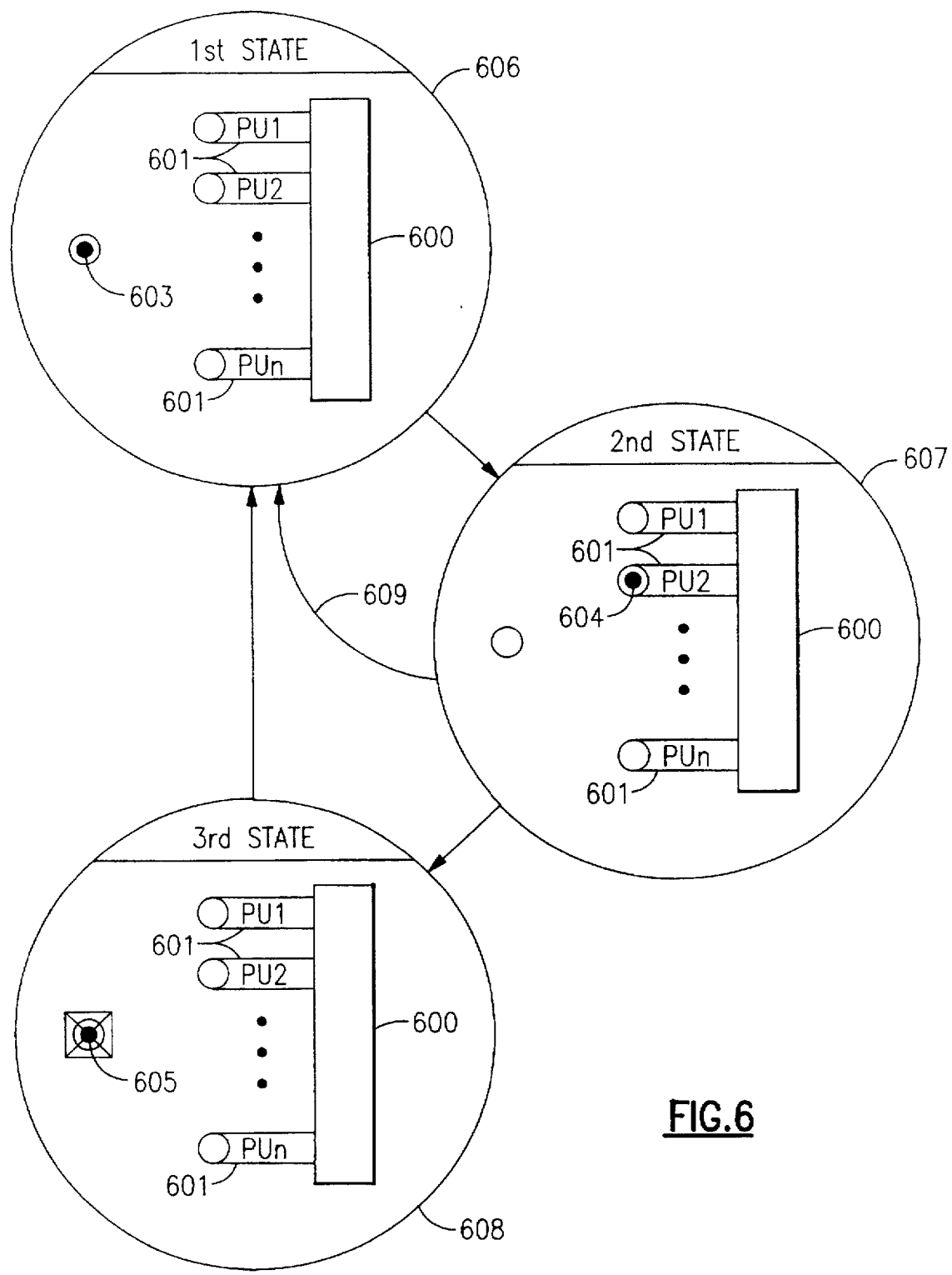
FIG. 6 shows the three possible states which the token can assume according to the invention.

FIG. 6 gives a schematic representation of the various states which the token used for the serialisation may assume. A computer system (600) with several processors (601) is shown.

In the first state (606) of the system, the token (603) is not assigned to any of the processors, but it is available—meaning that on request from one of the processors, it can be assigned to that processor.

If this happens, the system shifts into the second state (607). The token is now assigned to one of the processors—in this case, to processor 2 (604). Processor 2 has thus received the authorisation to carry out special instructions which are to be processed serially. These instructions include all those in which an initiator task modifies a resource common to all processors, and initiates dependent tasks on the other processors which, for their part, modify local copies of the common resource. For PU2. the possession of the token means the right to be able to carry out the initiator task of an instruction of this sort.

When the initiator task has been completely executed, the PU2 replaces the token. This corresponds to step (405) in FIG. 4. Now, however, if dependent tasks which have not yet been completely executed are pending at the responder PUs, the token will not yet be available to other processors when it is replaced. The device to manage the token has thus shifted into the third state (608). While the token (605) is not assigned to any of the PUs (601), it is nevertheless not yet in the 'token available' status, because at least one of the PUs (601) has still not reset its 'command pending' signal. When this happens, that is to say, when all the responder PUs have accomplished the dependent tasks assigned to them, the token is released again, and the first state (606) is reached again. This corresponds to step (407) in FIG. 4. On request from one of the PUs (601), the token (603) can be assigned to it.

As an alternative to running sequentially through states 1 (606). 2 (607) and 3 (608), a changeover from the second state directly back to the first state (609) is possible in specific cases. This means that the token (604) which has been assigned to one of the processors becomes available again directly it is replaced. This manner of proceeding is reasonable for commands which consist solely of one single task, and whose execution does not therefore comprise the processing of dependent tasks. These commands can be serialised in the manner represented, with the commands already described, consisting of an initiator task and dependent tasks—a procedure which may be necessary in order to preserve the data integrity.

Figure 7A:
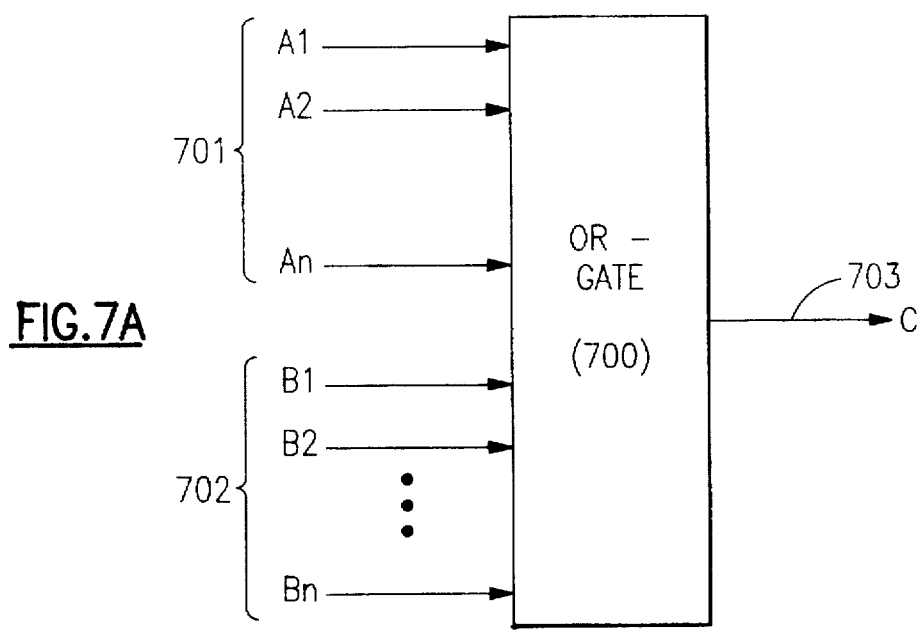
FIG. 7A shows the basic circuitry for the management of the token.

FIG. 7A shows the basic circuitry which is used to manage the token. For every processor i here, a signal Ai (701) is available which indicates whether the processor i is in possession of the token ('token received'). Furthermore, for every processor i, a signal Bi (702) is available, which indicates whether a dependent task which has not yet been completely executed is pending execution at processor i ('command pending'). Now, all these signals are processed into a signal C (703) by means of an OR chaining (700). Now, if either one of the Ai signals is set (which means that the processor i is in possession of the token) or else at least one of the Bi signals is set (which means that a dependent task which has not yet been completely executed is pending), then signal C (703) is also set. The meaning of this signal C is 'token not available'. The token can thus only be assigned to a requesting processor if signal C is not set, that is to say, when the token is 'available'.

In what follows, it will be attempted to establish a connection between the status of lines A1 to An (701), Bi to Bn (702) and C (703) on the one hand, and the states represented in FIG. 6 on the other hand. If the system to manage the token is in the first state (606), this means on the one hand that the token (603) is not assigned to any of the processors. For this reason, none of the A1 to An signals (701) is set. On the other hand, however, none of the processors can be in the 'command pending' status, since the token (603) could not then be available. Accordingly, none of the lines B1 to Bn (702) can be set either. It follows from this that signal C (703) is not set either. The token (603) is therefore in the 'token available' status.

If, in response to a request from one of the processors, the token is now assigned to this processor, precisely one of the A1 to An signals (701) must be set, which corresponds to the 'token received' status. Regardless of the status of the signal lines B1 to Bn (702), signal C, 'token not available', is therefore set. The token (604) which is assigned to a processor can no longer be assigned to any other processor. This status of the signals corresponds to the second state of the system (607).

The system now shifts into the third state (608), if the processor which was in possession of the token replaces the token, but the dependent tasks have not yet been completely executed. The corresponding signal line Ai ('token received') which was set until now, is reset on the return of the token. But since there are still unprocessed dependent tasks pending execution at the responder PUs, at least one of the B1 to Bn signals ('command pending') is set, and for this reason, signal C (703) is also set. This means that the token (605)—which has already been replaced—is still in the 'token not available' status in the third state.

It is only when all the dependent tasks have been completely processed that all the B1 to Bn lines ('command pending') are also reset. Signal C is then reset as well, and the system is back in the first state (606) again, with the token (603) again 'available'.

Figure 7B:
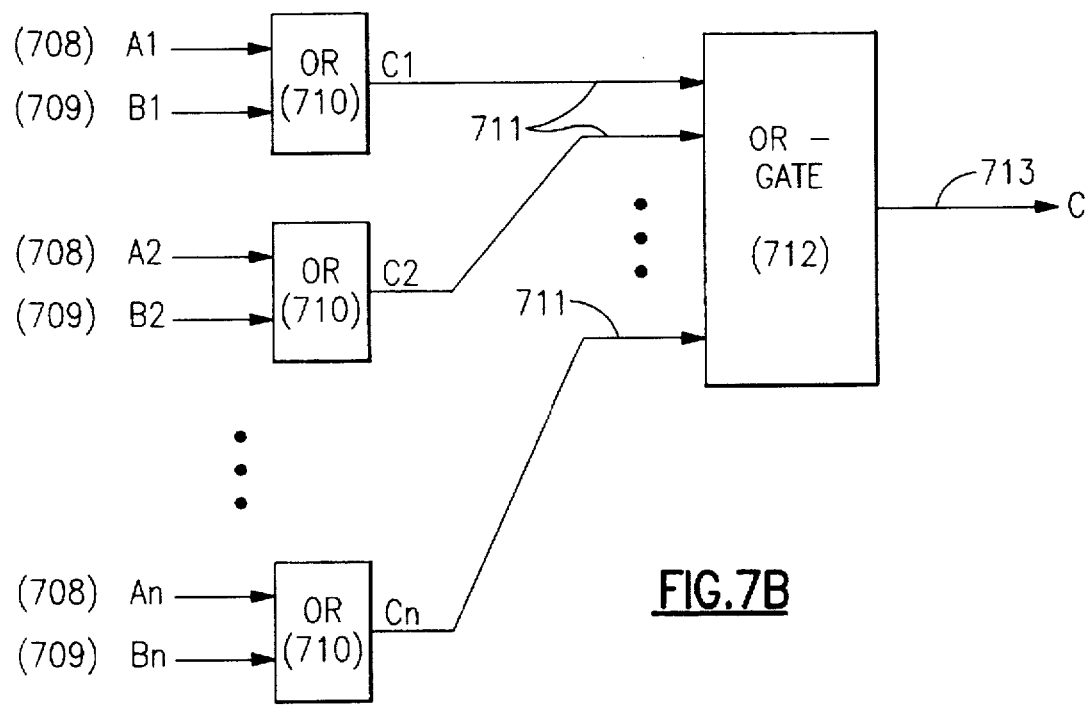
FIG. 7B shows another possibility of implementing the basic circuitry required to manage the token.

FIG. 7B shows a modification of the circuit represented in FIG. 7A, which is advantageous from the viewpoint of easy implementability. In this instance, the Ai (708. 'token received') and Bi (709. 'command pending') signals relating to a processor i are processed to form a Ci signal (711) on every processor, by means of an OR gate (710); said Ci signal is then applied at the input of the central OR gate (712). The output of this central OR gate is the C signal (713), which has the meaning 'token not available'. The advantage of dividing the large OR gate (700) of FIG. 7A into n small OR gates (710) and one central OR gate (712) has the advantage that it is no longer necessary to run two lines (Ai and Bi), but now only one (Ci) from each processor to the central OR gate (712). Otherwise, the circuits are equivalent.

Figure 8:
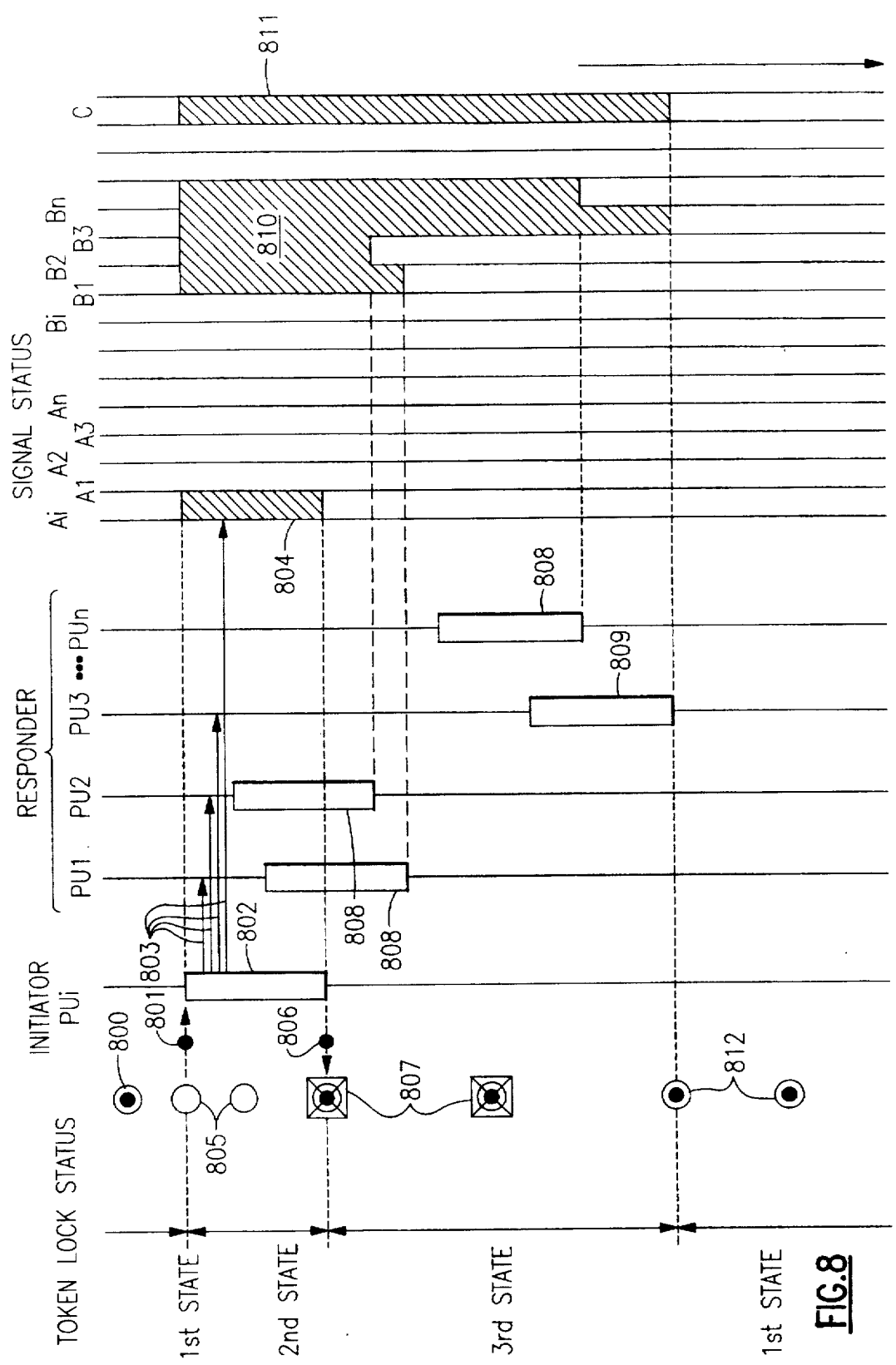
FIG. 8 shows the status of the signals of the circuit, depending on the current state of the token.

FIG. 8 attempts to represent the time sequence of the initiator task as well as of the dependent tasks, together with the time progression for signals A1 to An, B1 to Bn and C. Moreover, an attempt has been make to link this time sequence with the possible states of the system which are shown in FIG. 6.

At the start, the token (800) is in the first state (606), that is to say, the token is assignable to a PU on request ('token available'). Accordingly, none of signals A1 to An, B1 to Bn or C is set. Now, if processor i intends to initiate the invalidation of a page-table entry, it must first request the token. Since the token is available, it can be assigned to the processor i in response to the latter's request (801). On receipt of the token, the PUi sets the signal Ai, (804, 'token received').

The PUi is now in possession of the token and therefore has the right to execute the initial task (802) of an instruction which modifies a common resource. Since the token is now assigned to the PUi, it is no longer available to a another PU which requests the token (805). In this respect, the signal C (811, 'token not available') must also be set from the point in time at which the PUi received the token. In the course of executing the initial task (802), the initiating PUi sends requests (803) to the other PUs—the responders—asking them, for their part, to carry out the dependent tasks (808, 809) belonging to the initial task. The commands and the data for the more detailed specification of the dependent tasks to be carried out on the responder PUs are also written into the instruction buffers of the responders by the initiating PU. At the moment when commands and data are written into the instruction buffer of a responder PU by means of the Broadcast Forced Operation, the 'command pending' signal of the respective responder PU is set. As a consequence of the Broadcast Forced Operation initiated by the PUi, all B1 to Bn signals are set, with the exception of Bi (810).

On conclusion of the initiator task (802), the initiator PU replaces the token (806). At the same time, the Ai signal, which indicates the possession of the token by processor i, is reset (804). However, when this replacement occurs, the token does not become available for other PUs which request the token, since dependent tasks are still pending at the responder PUs (810). The system is now in its third state (608)—none of the PUs is in possession of the token (807), on account of which none of the lines A1 to An is set either. Signal C continues to be in the 'token not available' status (811). Now, if a responder PU reaches an interruptible point of its instruction flow, the respective dependent task which is pending execution (808, 809) can be inserted and executed. On termination of the execution of a dependent task on one of the responder PUs, for example on PU1, the 'command pending' signal relating to this responder—in this case B1—is reset (810).

On completion of the last of the dependent tasks (809) initiated by the initiator PU, the last 'command pending' signal which is still set is reset; the token—which has already been replaced—thereby becomes available again. The system thus changes over from state 3 into state 1 (812), and the status of signal C is 'token available' (811). The token can again be assigned to a PU which requests it. In this respect, the state now reached corresponds again to the initial state (800).

On consideration of the time-related change in the status of signals A1 to An, B1 to Bn and C, it becomes clear that signal C (811) can actually be represented as an OR chaining for signals A1 to An and B1 to Bn, as is envisaged in FIGS. 7A and 7B.

Figure 9:
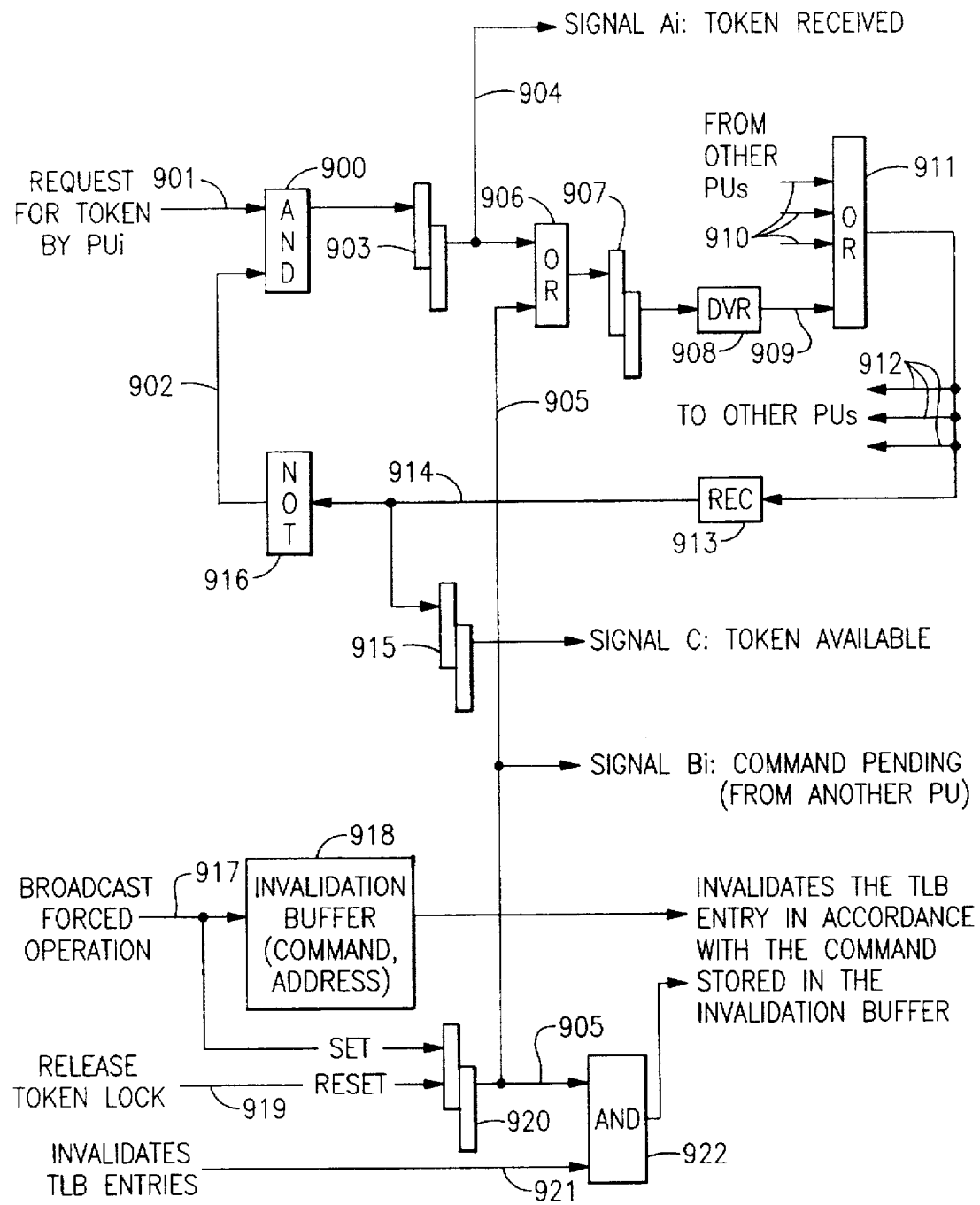
FIG. 9 shows a concrete circuit for the management of the token.

FIG. 9 shows a concrete circuit for the management of the token. When PUi requests the token, the signal line (901) is set to 'high'. Now, if the signal line (902) is simultaneously at 'high', meaning that the token is available, both inputs—and, accordingly, also the output—of the AND gate (900) are on 'high'. The output of the AND gate is stored temporarily in the latch (903). A 'high' signal on signal line Ai (904) means that it was possible to assign the token to the requesting PUi, because it was available at the time of the request. Signal Ai thus indicates whether processor i is in possession of the token (in which case the signal is set) or not.

Signal line Ai (904) and signal line Bi (905, 'command pending') form the inputs to the OR gate (906), which corresponds to the OR gate (710) in FIG. 7B. In this respect, the output of this OR gate (906) is signal Ci, which is temporarily stored in the latch (907). The connection (909) to a central OR gate (911) is established via a driver module (906), corresponding to the central OR gate (712) in FIG. 7B. All the other processors are also connected with an input of the central OR gate (911) via a connection (910) corresponding to the signal line (909) in each case. The inputs (909, 910) of the central OR gate (911) correspond here to signals C1 to Cn (711) in FIG. 7B. Accordingly, the output of the OR gate (911) indicates if either the Ai signal ('token received') or else the Bi signal ('command pending') are set on any of the PUs.

The output (912) of the central OR gate (911) corresponds to the signal line C (713) in FIG. 7B. If this signal line C is at 'high', this means either that one of the processors is in possession of the token (one of the Ai signals, 'token received', is set) or else that the token is still blocked, because a dependent task which has not yet been fully executed is pending at one of the processors (one of the Bi signals, 'command pending', is set). In this respect, the status 'high' for signal line C has the meaning that the token cannot be assigned to a PU requesting the token, and that the token is therefore not available ('token not available'). Accordingly, the token may only be assigned to a PU when signal line C is on 'low'. Signal C is now fed (912) from the central OR gate (901) to receivers located on each of the processors (913). On each of the processors, therefore, a signal line C (914, 'token not available') exists, whose status can be gauged from the respective latch (915).

Signal C (914) is now transformed via an inverter (916) into a signal (902) which is at 'high' precisely when the token is available ('token available'). This signal (902) is fed to the second input of the AND gate (900) in order to allow assignment of the token to processor i only when the token is in the 'token available' status (902).

Signal Bi (905, 'command pending') is set when a dependent task is pending at processor i. The command specifying the dependent task is written into the invalidation buffer (918), together with the data required in order to execute it, by means of a Broadcast Forced Operation via line (917). The latch (920) is also set via line (917). The output of this latch, signal line Bi (905, 'command pending') is then on 'high'. This signal (905) is reset when the PUi has completely executed the dependent task. This takes place by the latch (920) being reset by the 'release token lock' (919) signal which is present at its reset input. As a result of this, signal Bi (905, 'command pending') is also reset to 'low' again.

Whilst the initial task has the purpose of invalidating an entry in a page-table, the dependent tasks serve to delete the respective TLB entries of the responder PUs which relate to this page. Now, if a command to invalidate a TLB entry is written into the invalidation buffer (918), the 'invalidate TLB entries' signal (921) is set at the same time. Since the Bi signal (905) is also at 'high', the output of the AND gate (922) is also set if a TLB entry is to be invalidated. The deletion of the TLB entry can then be carried out according to the command stored in the invalidation buffer.

Figure 10:
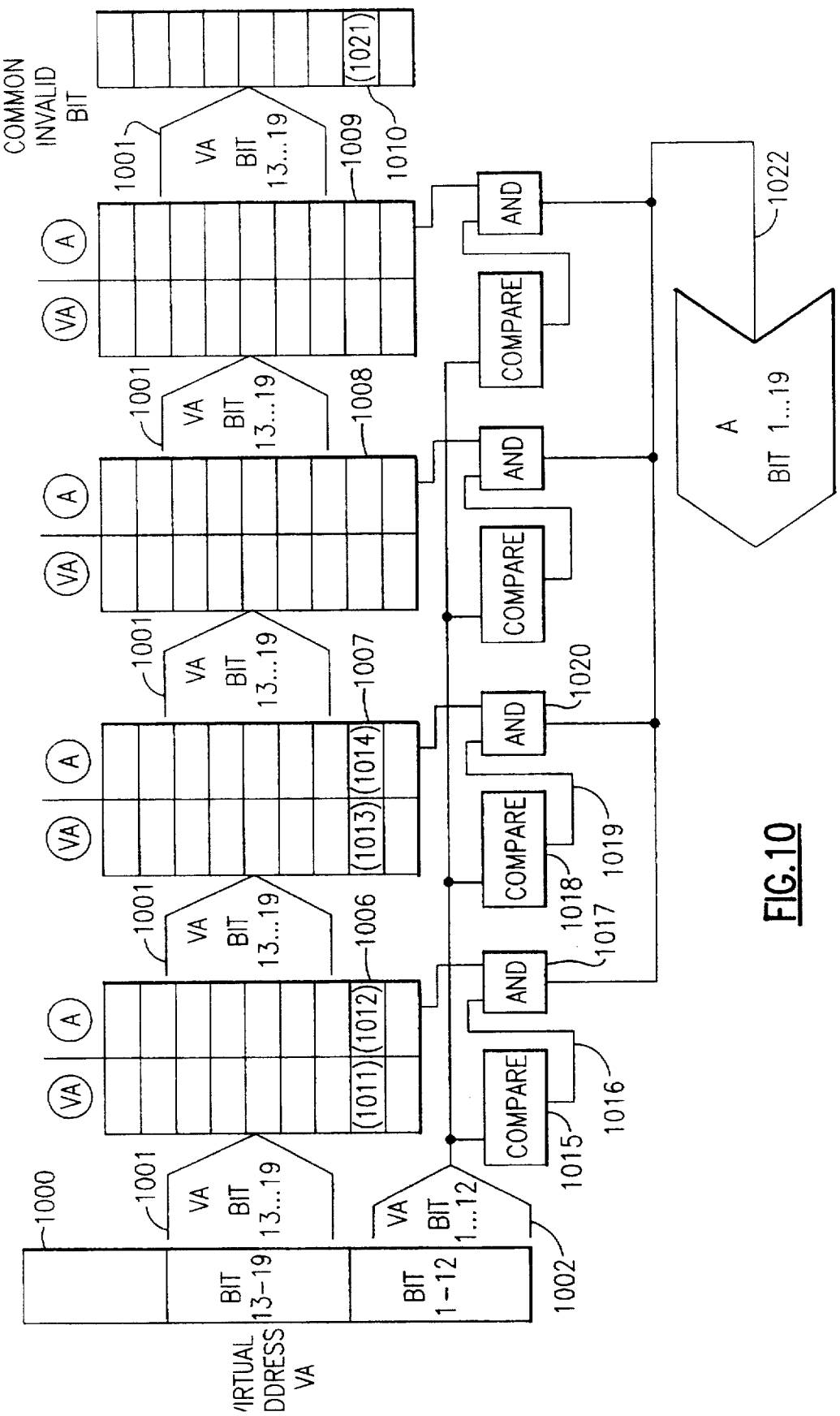
FIG. 10 shows the method of functioning of a quadruply associative address translation cache.

FIG. 10 shows the structure and mode of functioning of an address translation cache. In the case of a successfully performed address translation, an assignment of segment index and page index of the virtual address to the real initial address of the page is established in the memory with the help of the entries in the segment-table and the page-table. However, the number of processor cycles required for this translation is very high. Now, however, if the address translation required to address a page located in the memory has been carried out once, it is then possible to record the connection of the segment index and page index of the virtual address to the real initial address of the page in an entry in a table. The address translation cache represents a table of this sort, to assign the high-order component of the virtual address to the real initial address of the page. Now, if a processor addresses a page for the first time, the address translation must be carried out with the help of the segment-table and page-table. Following this, a corresponding entry is created in the TLB, by means of which the high-order component of the virtual address is assigned to the real initial address of the page. If the processor now wishes to access this page for a second time, it searches first in the TLB assigned to it for an entry relating to this page. If it finds an entry of this sort in its TLB, the performance of the explicit address translation has become unnecessary, and a great deal of time has been saved. The explicit address translation with the help of the segment-table and page-table is only carried out when a processor does not find an entry relating to the page in the TLB which is assigned to it.

Now, a TLB consists of one or more arrays (1006, 1007, 1008, 1009). It is the task of a TLB to perform an assignment of the high-order component of the virtual address to the real initial address of a page. Bits 13 to 19 of the high-order component of the virtual address (1001) are used to address one of the 128 entries in a column (1006) of the TLB. Now, each entry consists of a component which relates to the virtual address (1011), in which bits 1 to 12 of the virtual address are stored, and of the real initial address of the page (1012).

If, on the basis of a virtual address (100), a search is now to be carried out for a TLB entry which relates to the page designated by the virtual address, then first of all, one of the 128 entries of the TLB is addressed with the help of bits 13 to 19 of the virtual address (1001). The entry which is located in this manner now relates to that one of the most recently performed address translations in which there is conformity between bits 13 to 19 of the virtual address and the corresponding bits of the virtual address which is being sought. Now, however, in order to find out whether the entry really does describe the page being sought, a comparison is necessary between the bits 1 to 12 of the virtual address (1011) which are stored in the entry, and bits 1 to 12 of the virtual address (1002) which is being sought. This comparison is carried out in the comparator (1015). The output signal of the comparator (1016) is set when the compared bits match one another. In this case, the address bits 1 to 19 which are stored in the entry (1012) represent the high-order component of the real initial address for the page which is being sought. When the comparator output (1016) is set, the high-order component of the real address (1012) can be switched through to the address bus (1022) via the AND gate (1017).

Now, it is nevertheless possible that two different virtual addresses may have matching bits 13 to 19, but differing bits 1 to 12. Since the addressing of the arrays is undertaken via bits 13 to 19, the entry for the address which was translated later would overwrite the address which was translated earlier, in the event that only one column (1006) was available. Therefore, in order to have the possibility of creating coexisting entries in the TLB for virtual addresses whose bits 13 to 19 match one another but whose bits 1 to 12 differ from one another, it is necessary to create further columns parallel to the first column. FIG. 10 shows four columns: in this case, the term "quadruply associative address translation cache" is used. Each of the additional columns (1007, 1008, 1009)—analogously to the first column—is equipped with a comparator (1018) used for the purpose of comparing bits 1 to 12 of the virtual address; in the event that the virtual address matches, the output signal (1019) of this comparator switches the real initial address (1014) of the page to the address bus (1022) via the AND gate (1020). In the quadruply associative TLB shown in FIG. 10, up to four different entries which relate to the virtual addresses whose bits 13 to 19 match one another can now exist beside one another in the four columns (1006, 1007, 1008, 1009).

Now, when one of these four virtual addresses is to be translated with the help of the TLB, the four entries concerned in the four columns are first of all selected by means of bits 13 to 19 of the virtual address. Which of the four entries actually corresponds to the virtual address that is to be translated is now decided by a comparison performed by the comparators between bits 1 to 12 of the virtual address and the corresponding bits in the entries. The entry in that column whose comparator indicates that the bits match one another must be the right one. The real initial address which is stored in this entry is then switched to the address bus (1022) via the AND gate.

Bits 13 to 19 of the virtual address (1001) are also used to address a common invalid bit which is common to all columns. For this purpose, provision is made for an array (1010) consisting of 128 latches. To invalidate a TLB entry, the common invalid bit (1021) relating to this entry is set. However, a set common invalid bit relates to all four columns.

Figure 11B:
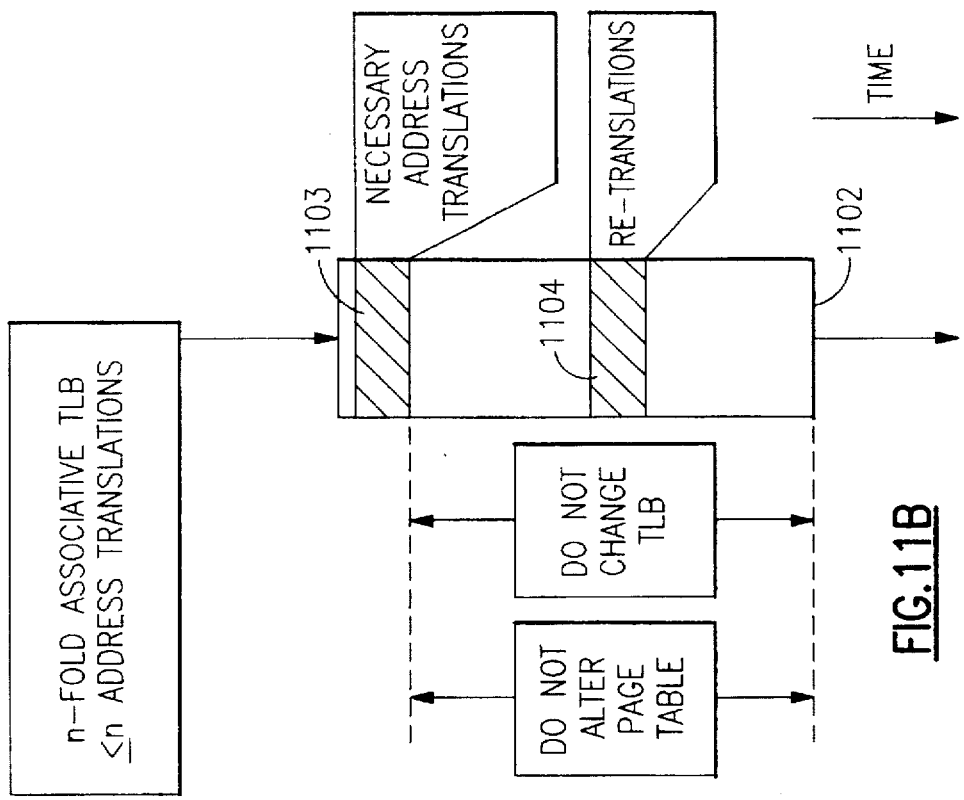
FIG. 11B shows the restrictions to be observed in the execution of an instruction requiring more than n address translations.
Figure 11A:
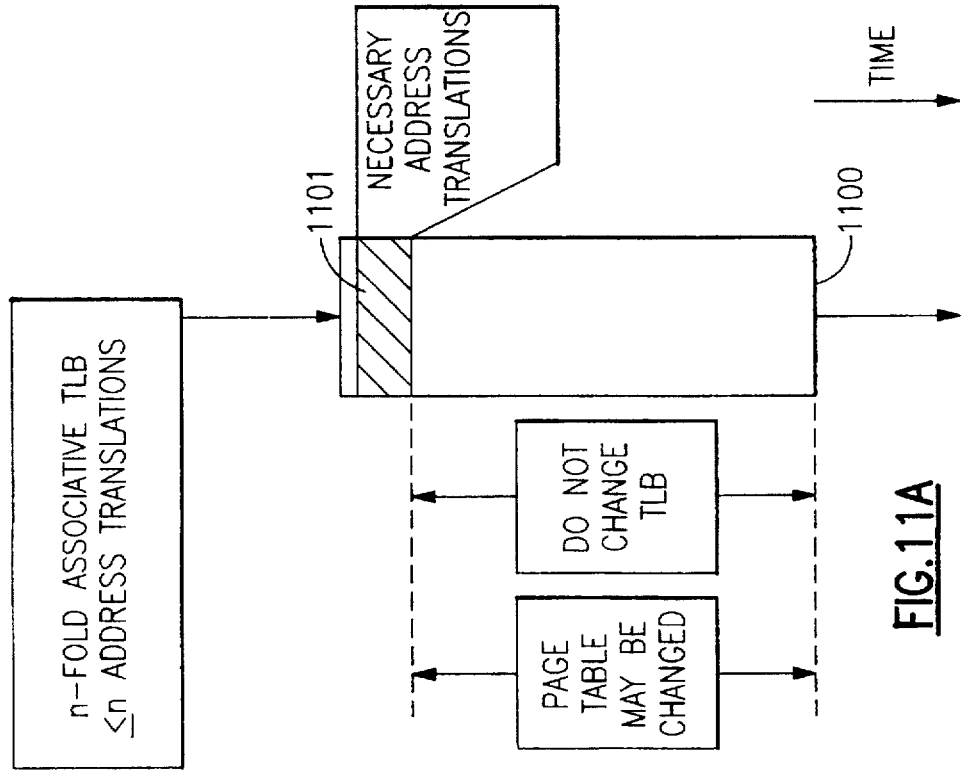
FIG. 11A illustrates the restrictions which must be observed in the execution of an instruction requiring fewer than n address translations on a processor with an n-tuply associative address translation cache.

An n-tuply associative TLB offers the possibility of simultaneously storing up to n address translations which are completely independent of one another. Thus, when an instruction is executed in the course of which no more than n address translations are required, all the necessary address translations can be carried out at the start of the instruction. This is shown in FIG. 11A. All the address translations which are required in order to carry out the instruction (1100) are executed (1101) at the start of the instruction. In order to execute these address translations, the instruction must be able to access the address translation tables in the memory, that is to say, the segment-table and the page-table. However, this is no longer necessary after the completion of the address translations, since a corresponding entry has been created in the TLB belonging to the processor for every address translation which has been carried out. If, therefore, the instruction (1100) wishes to access a specified address in the course of its execution, it can perform the access with the help of the corresponding TLB entry. If the number of address translations required by an instruction does not exceed the number of the TLB's columns which are available, then all necessary address translations can be carried out at the start of the instruction to be executed, and there is no longer any need for a subsequent access to the page-tables. This means that an instruction of this sort does not need to be serialised with the invalidation of a page-table entry, since the instruction now accesses its local TLB and no subsequent translations with the use of the page-table are required.

The situation is different when more than n address translations must be carried out in the course of the execution of an instruction, but the TLB which is available only features n columns. This case is shown in FIG. 11B. At the start of the instruction (1103) it is not possible to carry out all the address translations required by the instruction, because the entries required for this purpose are not available in the TLB. This means that a subsequent translation (1104) which again accesses the page-table has to take place in the further course of the instruction. Now, if the page-table were to be modified in the course of the instruction, between the first and the second address translation, problems of data integrity might arise. For this reason, an instruction of this sort which requires more than n address translations must be serialised with a command which modifies the page-table (for example, the invalidation of a page-table entry).

Figure 12:
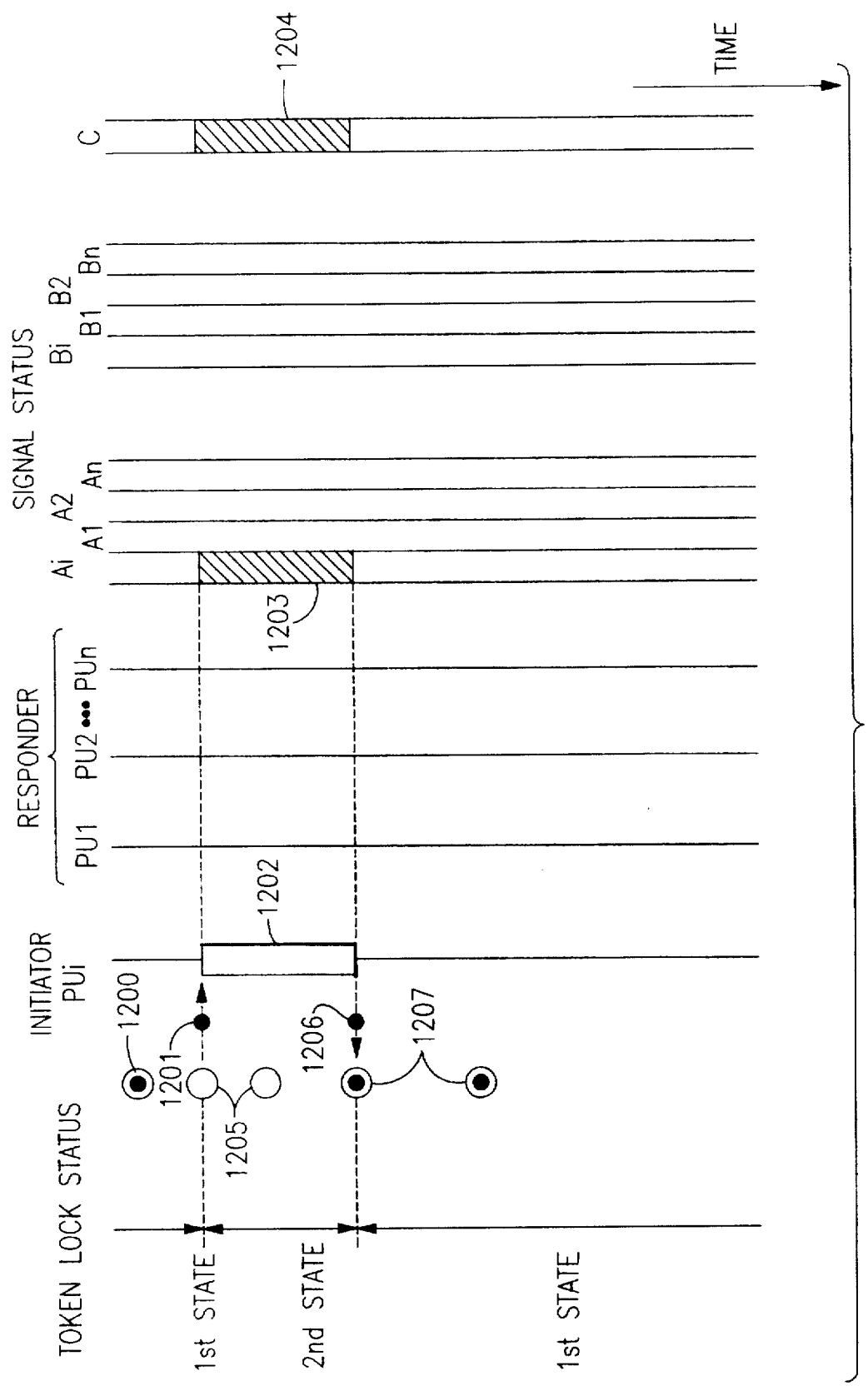
FIG. 12 shows the status of the signals depending on the state of the token, in the case of an instruction consisting only of one initial task.

According to the invention, this serialisation is accomplished in that the command which requires more than n address translations must be in possession of the token in order for it to be able to be executed. The corresponding sequence is shown in FIG. 12. At the beginning, the token is in the first state (1200). Now, if the processor i has to execute a command which requires more than n address translations, it must request the token. If the token is 'available', it can be assigned to the processor i (1201). Thus processor i has the authorisation to carry out the command (1202) completely. Since processor i is in possession of the token, signal Ai (1203, 'token received') is also set. The token cannot be assigned to other processors which request the token since the system is in the 'token not available' status (1204). On completion of the task carried out on the PUi (1202), the execution of the command is terminated, because no dependent tasks are to be carried out. This is the reason why the token becomes immediately available again (1207) when it is replaced (1206). The system thus shifts directly from the second state (607) to the first state (606), which corresponds to the arrow (609) in FIG. 6. This can also be read from the signal diagram in FIG. 12. On completion of the task executed on the PUi (1202), signal Ai (1203) is also reset. Since no dependent tasks have to be executed, none of the signals B1 to Bn are set either, and for this reason, signal C (1204), 'token not available' is immediately reset on termination of the task (1202), and the token becomes available again.

We claim:

1. Device to manage a token for the serialisation of instructions which are to be processed serially in a multiprocessor system, characterised in that a processor can only execute one of the instructions which are to be processed serially if it is in possession of a token, and the device to manage the token features the following states:

a first state, in which the token is not assigned to any of the processors, and the token can be assigned to a processor which requests the token;

a second state, in which the token is assigned to one of the processors, and the token cannot be assigned to a processor which requests the token; and a third state, in which the token is not assigned to any of the processors, and the token cannot be assigned to a processor which requests the token.

2. Device to manage a token according to claim 1, characterised in that the multiprocessor system comprises n processors:

for each processor I, for which an Ai signal is available which is set when processor i is in possession of the token;

for each processor i, for which a Bi signal is available, which is set when a task which has not yet been completely executed is pending at processor i, which task must be serialised with the execution of one of the instructions which are to be processed serially, on account of which the token cannot be assigned to a processor which requests the token;

and a signal C is available, which is common to the entire multiprocessor system, and which results from the OR chaining of the A1, . . . An, B1, . . . Bn signals of all processors, which have been listed already, and which is set when the token cannot be assigned to a requesting processor;

where the first status of the device to manage a token is characterised in that none of the signals A1, . . . An, B1, . . . Bn is set;

where the second state of the device to manage a token is characterised in that one of the signals A1, . . . An is set;

and where the third state of the device to manage a token is characterised in that none of the signals A1, . . . An is set, but at least one of the signals B1, . . . Bn is set.

3. Device to manage a token according to claim 2, characterised in that for each processor i, one signal Ci is available which results from an OR chaining of the Ai and Bi signals;

and the C signal which is common to the entire multiprocessor system results from an OR chaining of the C1, . . . Cn signals of all the processors.

4. Device to manage a token according to claim 2, characterised in that for each processor i, one signal is available which is set when the processor i requests the token, and which is present together with the inverted C signal at the input of an AND gate whose output is the Ai signal.

5. Device to manage a token according to claim 1, characterised in that the instructions which are to be processed serially comprise a first task to be executed on the initiating processor as well as dependent tasks to be executed on the responder processors, where the token must be assigned to the initiating processor so that the initiating processor can execute the first task, and where the token cannot be assigned to a processor which requests the token until the completion of all dependent tasks.

6. Device to manage a token according to claim 5, characterised in that an instruction buffer is allocated to every processor in the multiprocessor system, during the execution of the first task, the initiating processor writes commands and/or addresses into the instruction buffers of the responder processors, which commands and/or addresses specify the dependent tasks to be executed on the responder processors.

7. Device to manage a token according to claim 5, characterised in that during the execution of a first task, the initiating processor writes commands and/or addresses into the instruction buffers of the responder processors by means of a Broadcast Forced Operation, which commands and/or addresses specify the dependent tasks to be executed on the responder processors.

8. Device to manage a token according to claim 5, characterised in that during the execution of the first task, the initiating processor writes commands and/or addresses into the instruction buffers of the responder processors, where the Bi signal is also set with the writing into the instruction buffer of the responder processor i.

9. Device to manage a token according to claim 8, characterised in that on completion of the dependent task pending at the responder processor i, (the Bi signal is reset).

10. Device to manage a token according to claim 5, characterised in that the dependent tasks are inserted and executed at an interruptible point in the instruction flow of the responder processors.

11. Device to manage a token according to claim 5, characterised in that the multiprocessor system comprises a memory, in order to address the memory, a translation of virtual addresses into real ones can be undertaken with the help of address translation tables, address translations which have already been carried out are stored in one of the address translation caches, each of which is assigned to one of the processors, the instruction that is to be processed serially is an instruction to invalidate a page-table entry (IPTE), where the initiating processor invalidates the page-table entry during the execution of the first task, and where, during the execution of the dependent tasks, the other processors invalidate corresponding entries in the address translation caches assigned to them.

12. Device to manage a token according to claim 5, characterised in that the multiprocessor system comprises a memory,
- in order to address the memory, a translation of virtual addresses into real ones can be undertaken with the help of address translation tables,
- address translations which have already been carried out are stored in address translation caches, each of which is assigned to one of the processors,
- key information to stipulate the access rights of the individual processors to a page is stored in a part of the memory, namely the key storage,
- the instruction that is to be processed serially is an instruction to modify the key information (SSKE),
- where the initiating processor modifies the key information in the key storage during the execution of the first task, and where, during the execution of the dependent tasks, the other processors modify the key information in the address translation caches that are assigned to them.

13. Process to serialise instructions which are to be processed serially in a multiprocessor system,
- in which the execution of one of the instructions that are to be processed serially comprises the execution of a first task on an initiating processor,
- in which the initiating processor can only execute the first task if it is in possession of a token, and
- in which the token, if it is available, can be assigned to precisely one of the processors,
- which comprises the following steps:
- request for the token by the initiating processor;
- assignment of the token to the initiating processor, if the token is available;
- execution of the instruction that is to be processed serially;
- replacement of the token after the completion of the first task of the instruction that is to be processed serially, whereby the token does not necessarily have to become available to other processors;
- establishment of the availability of the token after the completion of the instruction that is to be processed serially.

14. Process to serialise instructions that are to be processed serially, according to claim 13, characterised in that one Ai signal is available for each processor i,
- on allocation of the token to the initiating processor i, the signal Ai (token received) is set,
- and the signal Ai is reset on replacement of the token after the completion of the first task.

15. Process to serialise instructions that are to be processed serially, according to claim 13, characterised in that the execution of the instructions that are to be processed serially comprises the execution of the first task on the initiating processor as well as the execution of dependent tasks on responder processors; and
- the availability of the token is established on conclusion of all dependent tasks.

16. Process to serialise instructions that are to be processed serially, according to claim 15, characterised in that one Bi signal is available for each processor i, the Bi signal is set if the execution of a dependent task is pending at the processor i,
- the Bi signal is reset on completion of the execution of the dependent task.

17. Process to serialise instructions that are to be processed serially, according to claim 15, characterised in that the dependent tasks are inserted and executed at an interruptible point of the instruction flow of the responder processors.

18. Process to serialise instructions that are to be processed serially, according to claim 15, characterised in that an instruction buffer is assigned to each processor in the multiprocessor system,
- during the execution of the first task, the initiating processor writes commands and/or addresses into the instruction buffers of the responder processors, which commands and/or addresses specify the dependent tasks to be executed on the responder processors.

19. Process to serialise instructions that are to be processed serially, according to claim 15, characterised in that during the execution of the first task, the initiating processor writes commands and/or addresses into the instruction buffers of the responder processors by means of a Broadcast Forced Operation, which commands and/or addresses specify the dependent tasks to be executed on the responder processors.

20. Process to serialise instructions that are to be processed serially, according to claim 18, characterised in that the Bi signal is also set with the writing into the instruction buffer of the responder processor I.

21. Process to serialise instructions that are to be processed serially, according to claim 15, characterised in that the multiprocessor system comprises a memory,
- in order to address the memory, a translation of virtual addresses into real ones can be undertaken with the help of address translation tables,
- address translations which have already been carried out are stored in address translation caches, each of which is assigned to one of the processors,
- the instruction that is to be processed serially is an instruction to invalidate a page-table entry (IPTE),
- where the initiating processor invalidates the page-table entry during the execution of the first task,
- and where, during the execution of the dependent tasks, the other processors invalidate corresponding entries in the address translation caches assigned to them.

22. Process to serialise instructions that are to be processed serially, according to claim 15, characterised in that the multiprocessor system comprises a memory,
- in order to address the memory, a translation of virtual addresses into real ones can be undertaken with the help of address translation tables,
- address translations which have already been carried out are stored in address translation caches, each of which is assigned to one of the processors,
- key information to stipulate the access rights of the individual processors to a page is stored in a part of the memory, namely the key storage,
- the instruction that is to be processed serially is an instruction to modify the key information (SSKE),
- where the initiating processor modifies the key information in the key storage during the execution of the first task,
- and where, during the execution of the dependent tasks, the other processors modify the key information in the address translation caches that are assigned to them.

23. Process to serialise instructions that are to be processed serially, according to claim 21, characterised in that the address translation cache is n-fold associative.

and an instruction which requires more than n address translations is serialised with the instruction to invalidate a page-table entry (IPTE).

24. Process to serialise instructions that are to be processed serially, according to claim 23, characterised in that the token must be assigned to a processor i in order that the processor i can execute the instruction which requires more than n address translations.

* * * * *